(No Model.)  2 Sheets—Sheet 1.
T. J. MAPES.
DISSOLVING COCK.
No. 296,984. Patented Apr. 15, 1884.
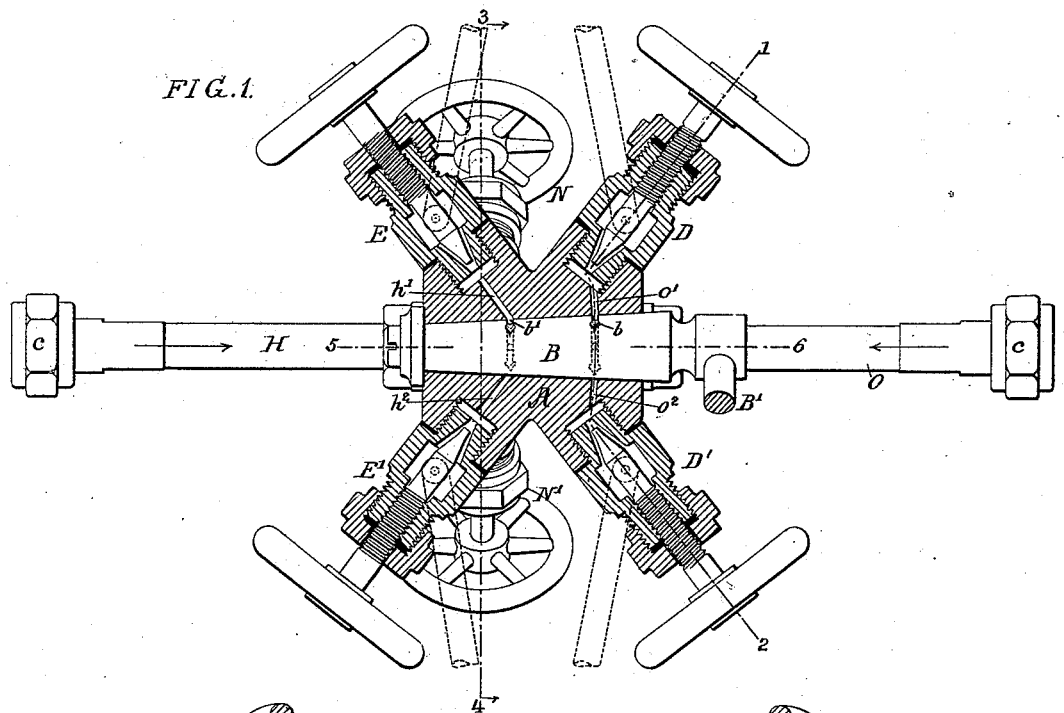
FIG. 1.
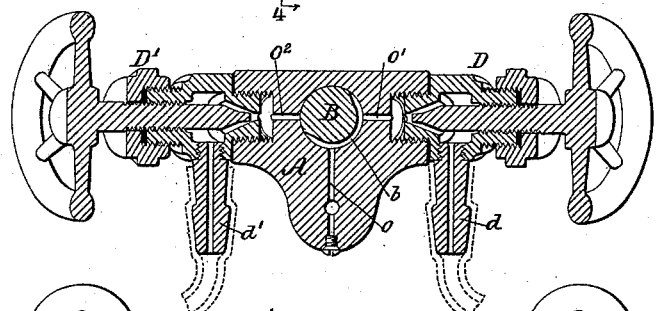
FIG. 2.
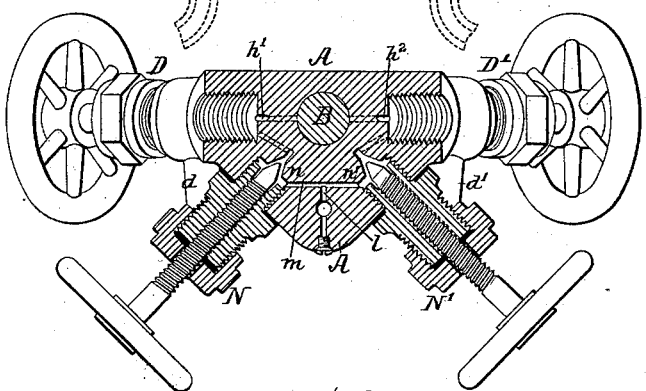
FIG. 3.
FIG. 6.
WITNESSES:
John E. Barker
James F. Tobin
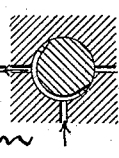 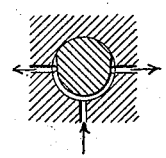 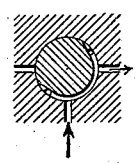
INVENTOR:
Timothy J. Mapes
by his Attys
Howson and Son
N. PETERS, Photo-Lithographer, Washington, D. C.

(No Model.) 2 Sheets—Sheet 2.

T. J. MAPES.
DISSOLVING COCK.

No. 296,984. Patented Apr. 15, 1884.

WITNESSES:
John E. Parker
James F. Tobin

INVENTOR:
Timothy J. Mapes
by his attys
Howson and Son

United States Patent Office.

TIMOTHY J. MAPES, OF PHILADELPHIA, PENNSYLVANIA.

DISSOLVING-COCK.

SPECIFICATION forming part of Letters Patent No. 296,934, dated April 15, 1884.

Application filed February 4, 1884. (No model.)

*To all whom it may concern:*

Be it known that I, TIMOTHY J. MAPES, a citizen of the United States, and a resident of Philadelphia, Pennsylvania, have invented a certain Improved Dissolving-Cock, of which the following is a specification.

My invention consists of improvements in the construction of what are termed "dissolving-cocks" for stereopticon apparatus, the object of my invention being to so construct the cock as to obtain a more delicate regulation in the supply of the gases to the two lanterns, and to produce better "dissolving" effects than heretofore.

Figure 4:
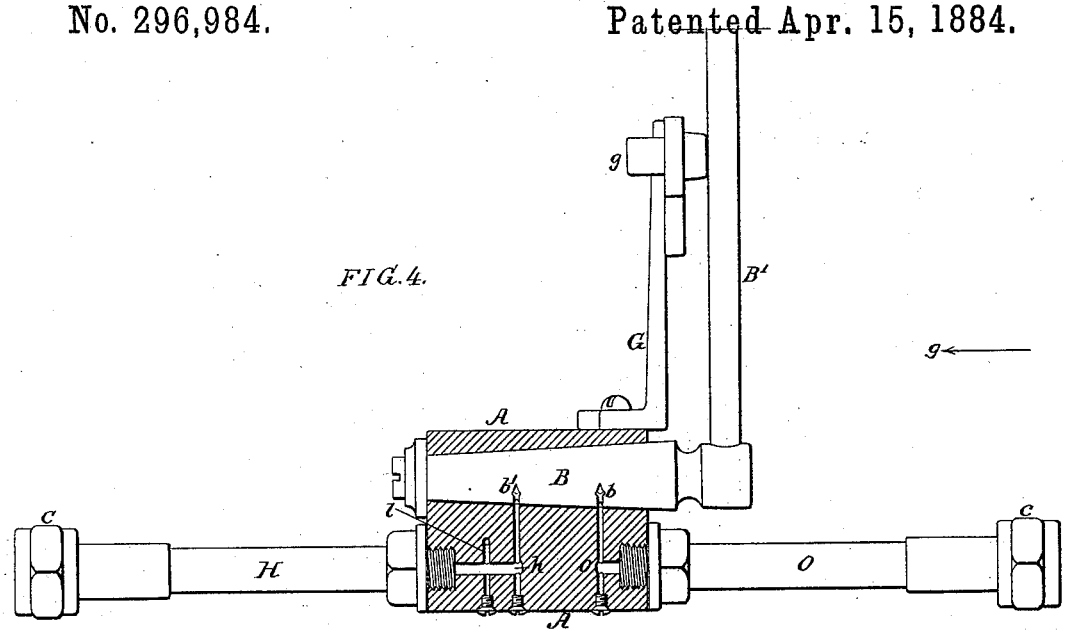
Figure 5:
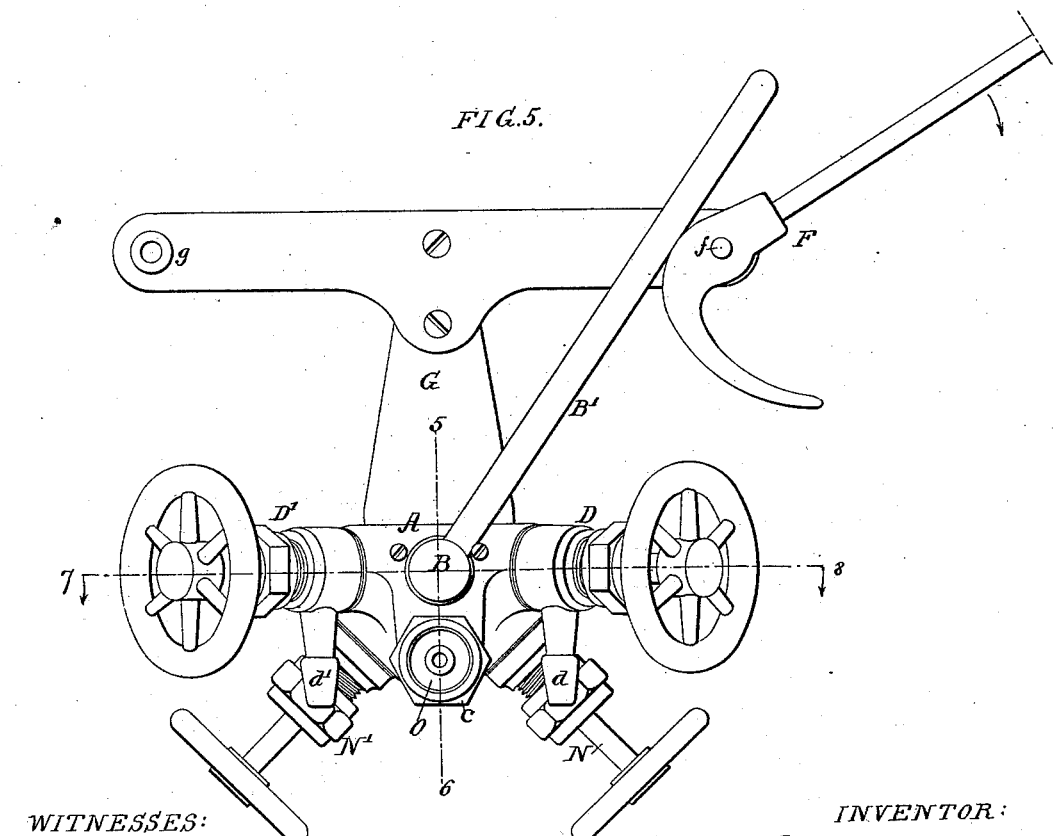

In the accompanying drawings, Figure 1 is a sectional plan view on the line 7 8, Fig. 5. Fig. 2 is a sectional view on the line 1 2, Fig. 1. Fig. 3 is a transverse section on the line 3 4, Fig. 1. Fig. 4 is a sectional view on the line 5 6, Figs. 1 and 5. Fig. 5 is an end view looking in the direction of the arrow 9, Figs. 1 and 4; and Fig. 6 shows diagrams of the different positions of the main plug.

A is the main casing of the valve, having a horizontal tapering opening, to which is adapted the corresponding tapering plug, B, forming the main valve of the dissolving-cock, and provided with a suitable operating-handle, B'. Into opposite ends of the casing, below the plug, are screwed pipes H and O, each provided with a coupling, $c$, Figs. 1 and 4, for connection with a gas-reservoir, the pipe H leading from the hydrogen-tank and the pipe O from the oxygen-tank. The pipe O is connected through a right-angled passage, $o$, with a groove, $b$, cut in the plug B, partly around its circumference, while the pipe H communicates with a similar groove, $b'$, through a passage, $h$, as shown in Fig. 4. Leading from points in line with this peripheral groove $b$, and on opposite sides of the plug, are two passages, $o'$ and $o^2$, Figs. 1 and 2, while two similar channels, $h'$ $h^2$, Figs. 1 and 3, branch from points in line with the groove $b'$. Each of these four channels leads to or is in communication through a valved passage with a nozzle, $d$, $d'$, $e$, or $e'$, to which is to be applied one of the flexible tubes leading to the two lanterns, as indicated by dotted lines in Fig. 2. These nozzles are applied to or formed on the casings of self-contained "needle-valves" D D' E E', which are screwed into the main body of the cock, each needle-valve consisting of a threaded stem adapted to a threaded opening in its casing, closed by a screw-cap and packing, and having a tapering or needle point adapted to a corresponding seat in its own casing, and being provided on the outside with a suitable hand-wheel to turn it, as fully illustrated in Figs. 1 and 2. These needle-valves form the valved passages referred to as leading from the channels $o'$ $o^2$ $h'$ $h^2$ to the corresponding nozzles. The valves D D' and their nozzles are for the supply of oxygen to the two lanterns, while the valves E E' are for the hydrogen. Thus, when the main plug B is turned to the position shown in Figs. 1 and 2 and right-hand side of Fig. 6, the oxygen entering through the pipe O can pass through the channels $o$ $o'$, valve D, and nozzle to the burner in one of the lanterns, and at the same time the hydrogen entering through the pipe H can pass through the channels $h$ $b'$ $h'$, valve E, and nozzle to the same lantern, while communication with the other lantern through the channels $o^2$ and $h^2$ is cut off. By reversing the cock B to the position Fig. 5 and left-hand diagram, Fig. 6, the supply of gases through these latter channels to the second lantern will be opened and the supply to the first lantern cut off. The lengths of the grooves $b$ $b'$ in the plug B in relation to the channels $o'$ $o^2$ and $h'$ $h^2$ are such, however, that the supply of gases to one lantern is never reduced until the other is turned on full; or, in other words, when the handle B' is in a vertical position and the plug is as shown in the middle diagram, Fig. 6, full communication is open to both lanterns, so that the desired dissolving effect is produced without that diminution of light thrown on the screen usual with cocks of the ordinary construction when changing from one lantern to the other.

By the use of the needle-valves described, I am enabled to regulate the relative supplies of hydrogen and oxygen to the greatest nicety, so as to produce the most perfect flame and avoid the annoying hissing sounds and explosions which result from the slightest overbalance of one gas over the other, and which seem to unavoidably attend the use of plug valves or cocks.

When it is desired to obtain a more than usually delicate movement of the plug B, a cam-lever, F, may be used; but this is not essential. This lever is provided with trunnions, $f$, on opposite sides, to be adapted to bearings $g$ in a cross-piece, G, mounted on the body of the cock, Figs. 4 and 5. To move the plug from either of its extreme positions, the lever F is placed with a trunnion in the adjacent bearing in the cross-piece G, and the desired gradual movement obtained by the cam as the lever F is depressed.

For the necessary constant supply of a small quantity of hydrogen to each lamp, I provide a channel, $l$, Figs. 3 and 4, opening into a cross-channel, $m$, and thence communicating through valved passages $n\ n'$, Fig. 3, with the valves E E′, these passages being controlled by suitable needle-valves, N N′, similar to the valves E E′ D D′, except that the tapering stems of the valves N N′ find their seats in the body A of the cock, instead of in their own casings.

I claim as my invention—

1. The combination of the body and main plug of a dissolving-cock and supply-pipes with channels leading from the plug, and needle-valves, substantially as described, controlling said channels.

2. The combination of the body and main plug of a dissolving-cock and supply-pipes with self-contained needle-valves detachably applied to said body, and channels leading from the plug to the valves, as set forth.

3. The combination of the nozzles $d\ d'$, to which are applied flexible tubes leading to the lanterns of a stereopticon apparatus, with a dissolving-cock having channels, and provided with a plug having grooves $b\ b'$ of the relative proportions herein set forth, whereby the dissolving effect is produced without diminishing the light on the screen in changing from one lantern to the other.

4. The combination of a dissolving-cock and its handled plug with a bearing-piece, G, and cam-lever F, substantially as described.

In testimony whereof I have signed my name to this specification in the presence of two subscribing witnesses.

TIMOTHY J. MAPES.

Witnesses:
HARRY E. GREAVES,
HUBERT HOWSON.